Jan. 12, 1943.  S. BECKWITH  2,307,755
HYDROGEN-FILLED APPARATUS
Original Filed Aug. 3, 1940
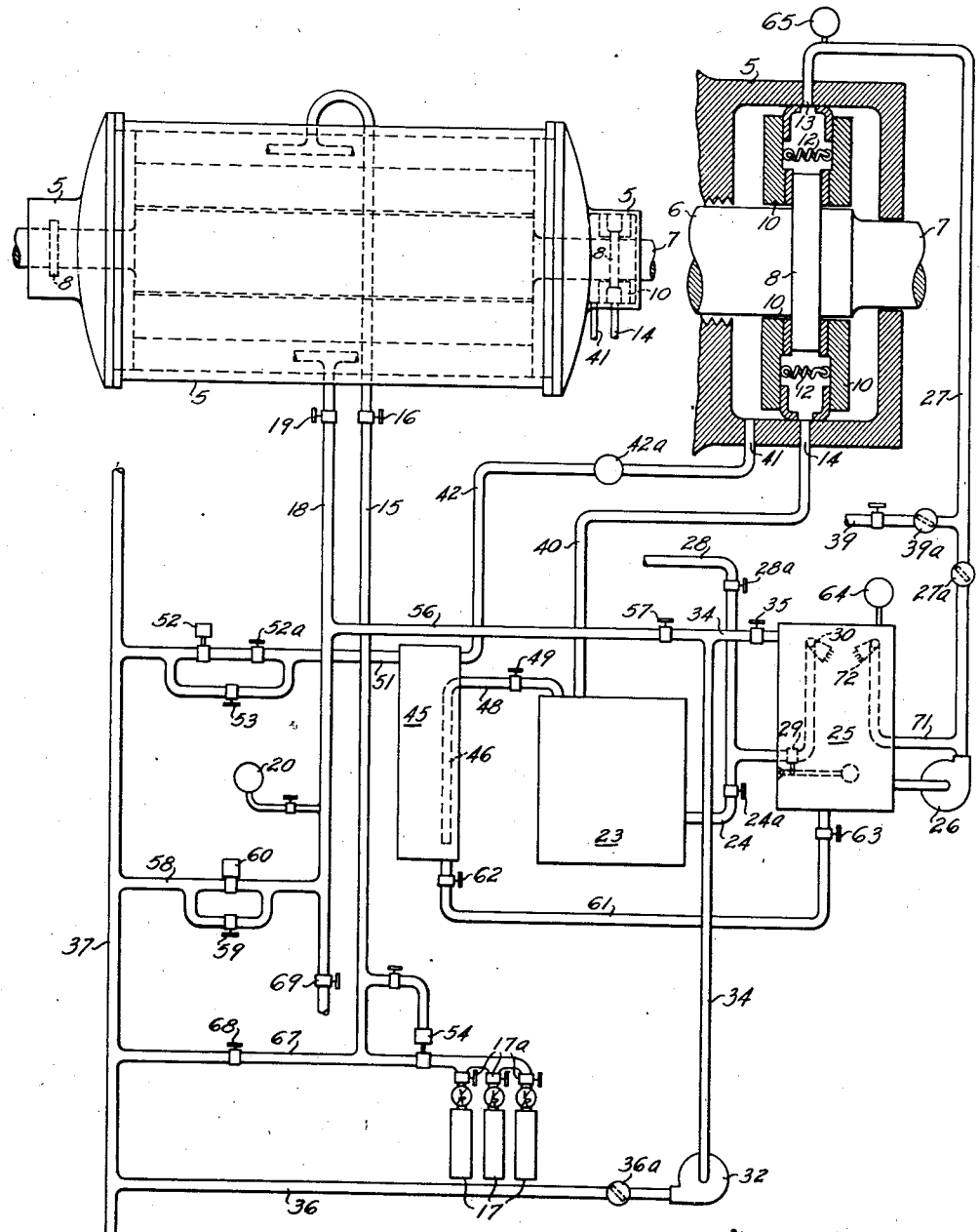
Inventor
S. Beckwith
by
Attorney Patented Jan. 12, 1943

2,307,755

UNITED STATES PATENT OFFICE 2,307,755

HYDROGEN-FILLED APPARATUS

Sterling Beckwith, Wauwatosa, Wis., assignor to Allis-Chalmers Manufacturing Company, Milwaukee, Wis., a corporation of Delaware Original application August 3, 1940, Serial No. 350,985. Divided and this application December 15, 1941, Serial No. 423,077

11 Claims. (Cl. 171—252)

The present invention relates in general to gas-filled apparatus and the operation and maintenance of the same, and it has more particular relation to hydrogen-cooled electrical machines, such as generators and synchronous condensers, utilizing a cooling medium of hydrogen gas, and the operation and maintenance of such machines.

One factor which is of considerable importance in the operation and maintenance of hydrogen-filled machines is the avoidance of explosive mixtures of hydrogen and air, or its oxygen constituent, during normal operation and also during the operation of filling the machine enclosure with hydrogen incident to placing the machine in operation initially and the operation of removing the hydrogen from the machine enclosure incident to taking the machine out of service, as for inspection and repairs.

The present invention contemplates improvements in hydrogen-filled apparatus, and more particularly in connection with the operation and maintenance of such apparatus under normal operating conditions and also in connection with the scavenging of the enclosed apparatus in filling it with, and emptying it of, hydrogen. And the invention contemplates as a feature thereof the utility of the apparatus in connection with the use of air as a scavenging agent, instead of a heretofore used and relatively expensive scavenging agent, such as carbon dioxide, in such a manner as to avoid explosive mixtures of air and hydrogen.

The present application is a division of applicant's copending application Serial No. 350,985, filed August 3, 1940, wherein there is disclosed a novel method of filling and scavenging hydrogen-filled apparatus and utilizing the principle that mixtures of hydrogen and air are non-explosive and non-combustible under pressures of approximately one-fifth of atmospheric pressure, and a system of appurtenant apparatus which effectively provides for the desired sealing of the hydrogen-filled machine enclosure under normal conditions and also the economical and safe filling and scavenging of the machine enclosure through the use of low pressure air.

The present invention is more particularly concerned with and has for an object the provision of an enclosed machine normally operating in a gaseous atmosphere with the enclosure sealed against passage of gas between the enclosure and the space occupied by oil for sealing or lubricating purposes or the surrounding atmosphere, and appurtenant apparatus of improved design for facilitating the scavenging of the machine enclosure and filling it with the desired gas; and the invention includes provision of appurtenant apparatus of such character as will readily permit the safe filling and scavenging of the machine enclosure, where hydrogen is used as the gaseous medium in which a rotary shaft dynamo-electric machine operates under normal conditions, with an oil seal about its shaft to prevent leakage of hydrogen from, or of air into, the machine enclosure.

It is a further object of the present invention to provide an improved design of enclosed hydrogen-filled machine and appurtenant apparatus of simple and economical design wherein a single vacuum pump is operable for effecting desired evacuation of the gaseous content of the machine enclosure and for establishing the desired vacuum for effecting vacuum drying of the oil utilized in the sealing of the machine enclosure.

These and other objects and advantages are attained by the present invention, various novel features of which will be apparent from the description herein and accompanying drawing, disclosing an embodiment of the invention, and will be more particularly pointed out in the annexed claims.

In the accompanying drawing, the single figure is a diagrammatic showing of a hydrogen-filled dynamo-electric machine, with a shaft seal of the machine shown in enlarged section, and appurtenances for controlling the supply of hydrogen to the machine for normal operation and effecting the scavenging of the machine through the use of air, and for maintaining a supply of oil of the desired character for sealing purposes.

In the drawing, 5 indicates the enclosing housing of a hydrogen-cooled dynamo-electric machine of the high speed turbo-generator type, the shaft 6 on which the rotor of the machine is mounted protruding from the housing of the machine and being provided with journal portions 7 located externally of the hydrogen-filled portion of the housing, and designed to be mounted in stationary bearings. The housing is effectively sealed about the rotating shaft through an annular flange or runner 8 on the rotating shaft near the end thereof and disposed in a recessed portion of the end wall of the housing 5 and an annular seal surrounding the runner 8 on the shaft and having a close running bearing upon the axial sides of the runner 8 to prevent leakage of hydrogen from the housing 5. As indicated, a conventional thrust bearing ring 10, with a babbitt or the like bearing face, bears on one, or preferably, on each axial face of the runner 8, these bearing rings being drawn into and held in desired close engagement with the opposed faces of the shaft runner 8 by means of a plurality of tension springs 12 between radially outer extensions of the thrust bearing rings.

Oil under pressure is circulated through the annular space between the bearing rings, from an inlet port 13 at the upper side of the seal occupying portion of the enclosing housing 5, and is discharged through a port 14 in the housing at the lower side thereof. Cup leathers, or washers or the like, are secured at the opposed outer edges of the bearing rings and have sealing engagement with the cylindrical wall of the housing. This supply of oil, fed at a pressure suitable to force cooling oil and to oppose the hydrogen gas pressure, maintains the sealing device cool and serves to lubricate the bearing surfaces of the runner 8 and the bearing rings 10. And the springs 12 serve to hold the bearing rings in sealing engagement with the runner 8 under a sufficient degree of pressure to insure against appreciable leakage past the seal of hydrogen from within the machine or of air from without the machine, in case the pressure within the machine drops below atmospheric pressure. Sealing devices of this character are already known in the art and in successful commercial use; and as the details of this seal form no part of the present invention, further description of this feature is omitted.

A hydrogen supply conduit 15, controlled by a valve 16, connects a battery of hydrogen flasks 17, controlled by valves 17ª, and preferably provided with reducing valves, to provide for feeding from any of the flasks as may be required, the discharge end of the hydrogen supply conduit opening into the upper part of the enclosing housing 5. An air supply conduit 18, controlled by a valve 19, opens into the enclosing housing 5 at the lower side thereof, this conduit being supplied with a pressure gauge 20. An oil supply tank or reservoir 23 is provided, and oil is supplied from this tank through a conduit, indicated at 24, and provided with a control valve 24ª, and through a vacuum drying tank 25, whence it is forced under pressure by a pump 26 to a supply conduit 27, controlled by a variable setting check valve 27ª and through which oil is delivered under suitable pressure to the port 13 at the upper side of the sealing device 8, 10 on the shaft adjacent the end of the enclosing housing, as well as to any other point which it is desired to supply from this source. An alternative supply, indicated at 28, for the vacuum tank 25 may be provided, if desired, a control valve 28ª being provided in the supply conduit 28.

As indicated, the supply of oil to the vacuum tank is automatically controlled by a float valve 29 from which the oil passes to a spray nozzle 30 which discharges the oil as a spray, to permit entrained water, in vapor form, to be removed from the oil. This vapor, and any air, are drawn off from the vacuum tank by a vacuum pump 32, through a conduit 34, controlled by a valve 35, the pump discharging to atmosphere through a conduit 36, provided with a check valve 36ª, and connected with the conduit 37 open to the atmosphere. An emergency oil supply, indicated at 39 and provided with a variable setting check valve 39ª for the conduit 27 feeding oil to the sealing device, may be provided, for use in case the vacuum tank is out of order.

The oil discharging from the port 14 at the lower side of the shaft sealing device discharges through a conduit 40 to the oil reservoir 23. And any oil that may leak past the shaft sealing device to the space open to the hydrogen content of the enclosed machine passes through a port 41, in the lower side of the enclosing housing wall, and a conduit 42, provided with a sight flow gauge 42ª to a detraining tank 45 containing, or forming with a straight vertical tube 46, an effective U-tube so that hydrogen cannot escape by way of the oil discharge conduit 48, controlled by a valve 49 and connected to the upper end of the vertical tube 46 within the upper part of the tank at a point removed from the upper end thereof. The U-tube thus provided is of sufficient vertical length, and the cross-section of the tank 45 is suitably great relative to the cross-section of the tube 46 that the increments of hydrogen-laden oil discharged into the tank from the conduit 42 will remain in the body of the tank sufficiently long during travel of such oil to the lower end of the tube 46, which is only slightly above the bottom of the tank 45, to permit hydrogen bubbles to escape from the oil to the space at the upper end of the tank 45 above the level of the oil therein, the oil level being determined by the position of the upper end of the vertical tube 46 and its connection to the conduit 48. Excess hydrogen in the gas space above the oil level in the detraining tank 45 passes to the machine enclosure 5 through the same conduit 42 and port 41 through which the hydrogen-laden oil passes to the detraining tank.

In case the purity of the hydrogen in the machine housing becomes too low, it may be raised by allowing hydrogen from the detraining tank to escape through a conduit 51, preferably controlled by an automatic valve 52, responsive to the degree of purity of the hydrogen, to the atmospheric conduit 37. The purity responsive valve preferably has a manually controlled valve 52ª in series with it, and both valves 52 and 52ª are preferably by-passed by a manually controlled valve 53. With the valve 53 closed and the valve 52ª open, opening of the valve 52 reduces the pressure of hydrogen within the system, and eventually causes the automatic pressure responsive valve 54 to open to admit a supply of pure hydrogen from the hydrogen flasks 17.

A conduit connection 56, controlled by a valve 57, is provided from the conduit 34 connected to the vacuum tank, to the air conduit 18, the latter being connected to the atmosphere conduit 37 through a conduit 58, controlled by a manually operated valve 59 and, if desired, by an automatic pressure operated relief valve 60. And a conduit connection 61, controlled by valves 62 and 63, is provided between the lower end of the detraining tank 45 and the vacuum tank 25. A vacuum gauge 64 is connected to the air or vacuum space of the drying tank 25; and a pressure gauge 65 is associated with the oil supply pipe 27 at a point adjacent its connection to the inlet port 13 of the enclosing housing 5. The hydrogen supply conduit 15 may be connected to the atmospheric conduit 37 through a conduit 67, controlled by a valve 68. And the air conduit 18 may have a valve 69 therein controlling an opening to atmosphere.

Assuming that the hydrogen-cooled machine is at rest and empty of hydrogen and disconnected from the hydrogen supply 17, with the valves 17ª closed, and that it is desired to place the machine in normal condition for operation, the valves 16 and 19 in the hydrogen and air conduits, respectively, are opened, and the valves 59 and 68 are also opened to connect the air and hydrogen conduits 18 and 15, respectively, to the atmospheric line 37, so that the pressure within the machine enclosure 5 may readily equalize with the existing outside atmospheric pressure.

Valves 16, 52ª, 53, 59, 68 and 69 are then closed, the valve 19 remaining open; and the valves 35, 57, 62 and 63 are opened. The pressure operated valve 60 remains closed except on the occurrence of excess pressure in the conduit 18.

The check valves in the oil supply lines 39 and 27 are simultaneously adjusted so that the pressure, as indicated on the gauge 65, on the oil supplied from the conduit 27 to the sealing device 8, 10 is about one pound.

With the valve 49 closed, the vacuum pump 32 is then started, at a suitable speed, with a normal cooling water circulation provided for such pump. The pump begins to exhaust the machine enclosure 5 through the air conduit 18, conduit 56 and conduit 34, and from the pump 32, through conduit 36 and conduit 37 to the atmosphere. As the conduit 34 is open at this time, through valve 35, to the vacuum space of the vacuum drying tank 25, the gauge 64 registers the degree of vacuum in the system at the inlet side of the vacuum pump.

When the vacuum in the system has risen to approximately twelve inches on the vacuum gauge 64, the vacuum pumping operation is continued, but preferably with the pump 32 operating at a higher speed than used during the initial stage of exhausting, until the vacuum is raised to twenty-four inches, corresponding to one-fifth atmospheric pressure, or, if desired, somewhat higher, depending on the characteristics of the shaft seal. A conventional sight-flow gauge 42ª in the conduit 42 indicates the flow of oil therein.

With the vacuum of twenty-four inches (one-fifth of atmospheric pressure) maintained, the valve 16 and one or more valves 17ª should be opened, thus providing a supply of hydrogen from the flasks 17, through the conduit 15, to the upper portion of the machine enclosure 5. The vacuum should be maintained close to twenty-four inches, and preferably not above the latter figure, during this operation. Sufficient hydrogen is admitted to the machine enclosure during this operation to take the place of the air being evacuated at the low pressure and to fill the space volume within the enclosure at the vacuum maintained, i. e., twenty-four inches.

When the air has been fully evacuated from the machine enclosure and replaced by hydrogen at approximately one-fifth of atmospheric pressure, the vacuum pump 32 is then shut down, and the valves 57 and 35 are closed; and sufficient additional hydrogen is supplied, with the valve 16 opened, from the flasks 17 to bring the pressure within the machine enclosure 5 up to about one-half pound above atmospheric pressure, as indicated on gauge 20. In the course of this latter process, as the hydrogen pressure reaches zero (atmospheric) within the machine enclosure 5, the valves 49 and 52ª are opened and the valves 62 and 63 are closed. And the valve 35 is opened to place the drying tank 25 in communication with the pump 32, the latter operating at a suitable speed to maintain the desired degree of vacuum in the drying tank.

The machine is now free to operate under normal conditions in a medium of hydrogen gas at a slight positive pressure, sufficient to repel the entrance of air from the external surroundings, the desired degree of purity and pressure of the enclosed hydrogen gas being automatically controlled by devices known in the art, to maintain the same at desired normal operating values. Under this normal operating condition, the setting of the check valves in the oil supply lines 27 and 39 may be adjusted to bring the pressure of the oil fed to the sealing device 8, 10 up to normal value.

As indicated hereinabove, during the normal operation of the machine, the same vacuum pump 32 is used for maintaining the desired vacuum in the vacuum drying tank 25, as has been described hereinabove for evacuating the machine enclosure 5, except that, under this normal operating condition of the enclosed hydrogen-cooled machine, while the valve 35 is open, the valve 57 is closed. And the oil is now pumped from the drying tank 25 to the shaft-sealing device 8, 10 at a pressure of from twelve to fifteen pounds, and the oil, after passing therethrough and cooling and lubricating the sealing device, passes off, through the port 14 and conduit 40 to the reservoir 23; and any leakage past the sealing device toward the body portion of the machine enclosure passes off, through port 41 and conduit 42 to the detraining tank 45 where any included hydrogen is detrained, the hydrogen-free oil passing then to the oil reservoir 23 from which it is recirculated through vacuum treating tank 25, as described hereinabove.

Assuming now that the machine is inoperative and it is desired to remove the hydrogen content of the machine enclosure 5, then, with the hydrogen supply valves 17ª closed, and the valves 52ª, 53, 59, 68, 69 and 49 closed, and valves 16, 19, 35, 57, 62 and 63 opened, the vacuum pump 32 is operated to exhaust the machine enclosure 5, through conduits 18, 56 and 34, through the pump 32, and through conduit 36 and the atmospheric conduit 37. This evacuation is proceeded with in the manner heretofore described until the vacuum in the machine casing is approximately twenty-four inches. At this stage, valve 68 is partially opened to admit sufficient air to maintain the vacuum at twenty-four inches while the vacuum pump is still running, for a sufficient time to insure that the air fully displaces the hydrogen during this process.

The vacuum pump is then stopped, and the valves 35 and 57 are closed; and the valve 69 and the valve 59, if desired, are opened wide until the pressure in the machine reaches zero (atmospheric). The valve 49 is then opened and the valves 62 and 63 are closed.

As indicated, a by-pass 71 may be provided from the discharge of the pump 26 which will recirculate any portion of the discharge from the pump through a second spray nozzle 72 within the vacuum tank. This will insure fuller vacuum drying treatment of oil received by the pump from the supply in the bottom of the vacuum tank.

Through the use of the hereinabove described system, it is possible to utilize the regular vacuum pump normally provided for operating the vacuum drying tank 25, to evacuate or scavenge the machine enclosure of air, incident to filling the machine with hydrogen, or to evacuate or scavenge the machine enclosure of hydrogen, incident to replacing the hydrogen with air. And through the connection of the hydrogen-detraining tank 45 with the vacuum treating tank 25, through the conduit 61, it is possible to remove oil from the machine while the same is under vacuum.

The relative simplicity, or lack of complication, and the advantages of the control system hereinabove described in connection with hydrogen-filled apparatus, and more particularly the advantages incident to avoiding the use of special scavenging gas, such as carbon dioxide, and the saving in excess hydrogen required to fill the machine enclosure at normal operating pressure and purity, will be definitely apparent from the disclosure hereinabove.

It should be understood that the present invention is not limited to the exact details of operation and construction described and shown herein, for obvious modifications within the scope of the appended claims will be apparent to persons skilled in the art.

It is claimed and desired to secure by Letters Patent:

1. In combination with a housing enclosing a rotary shaft dynamo-electric machine and containing hydrogen during normal operation of the machine and having a seal for sealing against leakage of hydrogen from the interior of said housing along said rotary shaft, means for circulating oil about said shaft seal, means for detraining hydrogen from oil passing from said shaft seal to the inner side thereof, vacuum producing means, controllable conduit connections from the interior of said enclosing housing to the inlet of said vacuum producing means, and means operative to cause oil to be drawn from the inner side of said shaft seal through said detraining means while the interior of said enclosing housing is subjected to sub-atmospheric pressure by said vacuum producing means.

2. In combination with a housing enclosing a rotary shaft machine and containing gas during normal operation of the machine, and having a rotary shaft seal for sealing against leakage between the outside atmosphere and the interior of said housing along said shaft, means for circulating oil about said shaft seal, means for detraining gas from oil passing through said shaft seal to the gas side thereof, a vacuum drying tank operative to treat oil returned from the gas side of said shaft seal through said detraining means, a vacuum pump, controllable conduit connections from the interior of said enclosing housing and said vacuum tank to the inlet of said vacuum pump, and a conduit connection from the lower oil space of said detraining means and said vacuum tank for substantially equalizing the pressures therein while the interior of said enclosing housing is subjected to sub-atmospheric pressure by said vacuum pump.

3. In combination with a housing enclosing a rotary shaft machine and containing a gas lighter than air under a pressure above atmospheric during normal operation of the machine, and a rotary shaft seal for sealing against leakage of said lighter gas from said housing along said shaft, means for circulating oil about said shaft seal, means for detraining gas from oil passing through said shaft seal to the inner side thereof, a vacuum drying tank for treating said oil, a vacuum pump, controllable conduit connections from the interior of said enclosing housing and the air space of said vacuum tank to the inlet of said vacuum pump, and means for causing the pressure within said detraining tank to be reduced while the interior of said enclosing housing is subjected to sub-atmospheric pressure by said vacuum pump, said latter means comprising a controllable connection between the liquid-containing spaces of said detraining tank and said vacuum tank.

4. In combination with a housing enclosing a rotary shaft dynamo-electric machine and containing hydrogen under a positive pressure during normal operation of the machine and a seal for sealing against leakage of said hydrogen from said housing along said rotary shaft, means for circulating oil under pressure about said shaft seal, hydrogen-detraining means receiving oil passing through said shaft seal to the hydrogen side thereof, a vacuum drying tank for treating oil, a vacuum pump, controllable conduit connections from the interior of said enclosing housing and the air space of said vacuum tank to the inlet of said vacuum pump, and a controllable connection between the liquid-containing spaces of said detraining means and said vacuum tank for maintaining substantially equalized reduced pressures therein while the interior of said enclosing housing is subjected to reduced pressure by said vacuum pump.

5. In combination with a housing enclosing a rotary shaft dynamo-electric machine and containing a gas under pressure higher than atmospheric during normal operation of the machine, means for circulating oil about parts of said machine, a vacuum drying tank for treating oil used in the operation of said machine, a vacuum pump, controllable conduit connections from the interior of said housing and said vacuum tank to the inlet of said vacuum pump whereby said pump is operative to establish sub-atmospheric pressures in either or both said housing and said vacuum tank.

6. In combination with a housing enclosing a rotary shaft dynamo-electric machine and containing hydrogen under pressure higher than atmospheric during normal operation of the machine and a seal for sealing against leakage of said hydrogen from said housing along said rotary shaft, means for circulating oil about said shaft seal, means for detraining hydrogen from oil leaking past said seal to the hydrogen side thereof, a vacuum drying tank for treating oil used in the operation of said machine, a vacuum pump, controllable conduit connections from the interior of said housing and said vacuum tank to the inlet of said vacuum pump whereby said vacuum pump may serve to produce desired reduced pressure in said vacuum tank alone or in the enclosing housing and said vacuum tank jointly, and controllable means for equalizing the pressures in said vacuum tank and said detraining means while said vacuum pump is producing sub-atmospheric pressure in said housing.

7. In combination with a housing enclosing a rotary shaft dynamo-electric machine and containing hydrogen under pressure higher than atmospheric during normal operation of the machine and a seal for sealing against leakage of said hydrogen from said housing along said rotary shaft, means for circulating oil about said shaft seal, means for detraining hydrogen from oil passing from said shaft seal to the hydrogen side thereof, a vacuum drying tank operative to treat oil returned from said shaft seal through said detraining means, a vacuum pump, controllable conduit connections from the interior of said enclosing housing and said vacuum tank to the inlet of said vacuum pump whereby said vacuum pump may serve to produce desired reduced pressure in said vacuum tank or in said enclosing housing and said vacuum tank jointly, and a controllable conduit connection between the oil-containing spaces of said detraining means and said vacuum tank permitting flow in either direction therebetween whereby the pressures in said detraining means and said vacuum tank may be substantially equalized and the drying operation of said vacuum tank maintained while said vacuum tank is operating to produce sub-atmospheric pressure in said housing.

8. In combination with a housing enclosing a rotary shaft dynamo-electric machine and containing hydrogen under pressure during normal operation of the machine and provided with an oil sealing device for sealing against leakage about the shaft between the interior of said machine enclosure and the exterior thereof, and having ports for supplying oil to and discharging it from said sealing device and for discharging from the machine enclosure oil leaking past said sealing device toward said machine, a reservoir constituting a source of sealing oil and having a supply connection thereto from the discharge port of said sealing device, a hydrogen-detraining receptacle having a connection thereto from the discharge port at the machine side of said sealing device, a connection from the oil space of said detraining receptacle to said reservoir a vacuum drying tank having a supply connection to its oil space from said reservoir and a discharge connection from said oil space to the supply port of said oil sealing device a vacuum pump having controllable connections from its inlet to both the machine enclosure and the air space of said vacuum drying tank and a controllable connection between the oil spaces of said detraining receptacle and said vacuum drying tank and independent of said storage reservoir.

9. In combination with a housing enclosing a rotary shaft dynamo-electric machine and containing hydrogen under pressure during normal operation of the machine and provided with an oil sealing device for sealing against leakage about the shaft between the interior of said machine enclosure and the exterior thereof, and having ports for supplying oil to and discharging it from said sealing device and for discharging from the machine enclosure oil leaking past said sealing device toward said machine, a reservoir constituting a source of sealing oil and having a supply connection thereto from the discharge port of said sealing device, a hydrogen-detraining receptacle having a connection thereto from the discharge port at the machine side of said sealing device, a connection from the oil space of said detraining receptacle to said reservoir, a vacuum drying tank having a supply connection to its oil space from said reservoir and a discharge connection from said oil space to the supply port of said oil sealing device, a vacuum pump having controllable connections from its inlet to both the machine enclosure and the air space of said vacuum drying tank, and a controllable connection between the oil spaces of said detraining receptacle and said vacuum drying tank and permitting the controlled flow of oil in either direction between said detraining receptacle and said vacuum drying tank.

10. In combination with a housing enclosing a rotary shaft dynamo-electric machine and containing hydrogen under pressure during normal operation of the machine and provided with an oil sealing device for sealing against leakage about the shaft between the interior of said machine enclosure and the exterior thereof, and having ports for supplying oil to and discharging it from said sealing device and for discharging from the machine enclosure oil leaking past said sealing device toward said machine, a reservoir constituting a source of sealing oil and having a supply connection thereto from the discharge port of said sealing device, a hydrogen-detraining receptacle having a supply connection thereto from the discharge port at the machine side of said sealing device, a connection from the oil space of said detraining receptacle to said reservoir, a vacuum drying tank having a supply connection to its air space from said reservoir and a discharge connection from its oil space to the supply port of said oil sealing device, a vacuum pump having controllable connections to its inlet from both the machine enclosure and the air space of said vacuum drying tank, and a controllable connection independent of said reservoir between the oil spaces of said detraining receptacle and said vacuum drying tank, and permitting the controlled flow of oil in either direction between said detraining receptacle and said vacuum drying tank.

11. In combination with a housing enclosing a rotary shaft dynamo-electric machine and containing hydrogen under pressure during normal operation of the machine and provided with an oil sealing device for sealing against leakage about the shaft between the interior of said machine enclosure and the exterior thereof, and provided with ports for supplying oil to and discharging it from said sealing device and for discharging from the machine enclosure oil leaking past said sealing device toward said machine, controllable conduit connections between the interior of said machine enclosure and both the atmosphere and a source of hydrogen supply, a reservoir constituting a source of sealing oil and having a conduit connection thereto from the discharge port from said sealing device, a hydrogen-detraining receptacle the gas space of which is provided with a controllable conduit connection to the discharge port at the machine side of said sealing device, a conduit connection from the oil space of said detraining receptacle to said reservoir, a vacuum drying tank having a supply connection to its air space from said reservoir and a discharge connection from its oil space to the supply port of said oil sealing device, a vacuum pump, controllable conduit connections from both said machine enclosure and the air space of said vacuum drying tank to the inlet of said pump whereby said vacuum drying tank and said machine enclosure may be evacuated simultaneously or separately, and a controllable connection between the oil spaces of said detraining receptacle and said vacuum drying tank and permitting equalization of pressure in said detraining receptacle and said vacuum drying tank during simultaneous evacuation of both thereof.

STERLING BECKWITH.